United States Patent
Nield et al.

(10) Patent No.: US 11,441,413 B2
(45) Date of Patent: Sep. 13, 2022

(54) APPARATUS AND METHOD FOR MONITORING A POWER SWIVEL SYSTEM

(71) Applicants: Barry J. Nield, Jacksonville Beach, FL (US); George A. Nield, Jacksonville Beach, FL (US)

(72) Inventors: Barry J. Nield, Jacksonville Beach, FL (US); George A. Nield, Jacksonville Beach, FL (US)

( * ) Notice: Subject to any disclaimer, the term of this patent is extended or adjusted under 35 U.S.C. 154(b) by 684 days.

(21) Appl. No.: 16/504,307

(22) Filed: Jul. 7, 2019

(65) Prior Publication Data
US 2021/0002997 A1 Jan. 7, 2021

(51) Int. Cl.
| | |
|---|---|
| *E21B 44/04* | (2006.01) |
| *G08B 21/18* | (2006.01) |
| *H04Q 9/00* | (2006.01) |
| *E21B 19/16* | (2006.01) |
| *G05B 23/02* | (2006.01) |
| *G05D 16/00* | (2006.01) |
| *B25B 23/145* | (2006.01) |
| *E21B 49/00* | (2006.01) |

(52) U.S. Cl.
CPC ............ *E21B 44/04* (2013.01); *B25B 23/145* (2013.01); *E21B 19/166* (2013.01); *G05B 23/0235* (2013.01); *G05D 16/00* (2013.01); *G08B 21/182* (2013.01); *H04Q 9/00* (2013.01); *E21B 49/003* (2013.01)

(58) Field of Classification Search
CPC ... G05B 23/0235; B25B 23/145; E21B 3/022; E21B 19/166; G01N 21/3504; G01V 8/02
See application file for complete search history.

(56) References Cited

U.S. PATENT DOCUMENTS

| | | | |
|---|---|---|---|
| 3,766,991 | A | 10/1973 | Brown |
| 4,073,352 | A | 2/1978 | Underwood |
| 4,432,064 | A | 2/1984 | Barker |
| 6,192,303 | B1 | 2/2001 | Takakura |
| 7,782,460 | B2 | 8/2010 | DiFoggio |
| 8,575,541 | B1 | 11/2013 | Jamison |
| 9,845,663 | B2 | 12/2017 | Nield |
| 9,915,108 | B1 | 3/2018 | Keast |
| 10,253,625 | B2 | 4/2019 | Williams |
| 10,273,761 | B2 | 4/2019 | SadAbadi |
| 10,323,484 | B2 | 6/2019 | Liess |

(Continued)

*Primary Examiner* — Mirza F Alam
(74) *Attorney, Agent, or Firm* — Steve LeBlanc, LLC (57) ABSTRACT

An apparatus for monitoring a power swivel system includes a smart box comprising a processing device electrically associated with a memory, communication technology and least one of a local display device or a remote display device where the communication technology. The smart box is associated with a power swivel system comprising a power swivel unit in fluid communication with a hydraulic pump system driven by a motor. The hydraulic pump system is configured to pump a hydraulic fluid through the power swivel unit to activate rotating elements. A plurality of sensors are connected to the processing device and various components of the power swivel system including the rotating elements to monitor such elements and minimize the possibility of an over speed and/or over torque condition. Data providing a status of the power swivel system components is transmitted to a remote device and presented to a user via a GUI.

20 Claims, 4 Drawing Sheets

(56) References Cited

U.S. PATENT DOCUMENTS

| | | | |
|---|---|---|---|
| 11,035,971 B2* | 6/2021 | Vinay | E21B 1/00 |
| 2002/0043620 A1* | 4/2002 | Tchakarov | G01N 21/3504 |
| | | | 250/269.1 |
| 2009/0284259 A1 | 11/2009 | Csutak | |
| 2010/0202932 A1 | 8/2010 | Danville | |
| 2013/0118734 A1 | 5/2013 | Csutak | |
| 2014/0009305 A1* | 1/2014 | Schultz | G01L 3/10 |
| | | | 340/870.01 |
| 2020/0057569 A1* | 2/2020 | Rojas | E21B 44/00 |
| 2020/0117318 A1* | 4/2020 | Jayabal | G06F 17/15 |

* cited by examiner

APPARATUS AND METHOD FOR
MONITORING A POWER SWIVEL SYSTEM

FIELD OF THE INVENTION

The present invention generally involves an apparatus and method for monitoring a drilling rig power swivel system including verifying proper operation of the power swivel system components and recording and reporting the status of same to local and remote devices.

BACKGROUND OF THE INVENTION

Drill rigs are commonly used in oil and gas production and well service operations and include heavy duty machinery to bore substantial distances below the earth's surface. Skidding systems are frequently utilized to move large structures and heavy-duty machinery around the rig or platform or between rigs. Skidding systems include three main types: cantilever skidding, drill floor skidding (lift and roll) and module skidding. Skid modules include pumping systems (e.g. Mud Pumps, Power Swivel System, etc.) and power generation systems.

Power swivel systems comprise a power swivel unit used on drilling rigs to rotate a drill string while allowing the introduction of drilling fluids into the drill string. Such power swivel systems often comprise a power swivel unit driven by a hydraulic system driven by a motor. The motor and hydraulic system are selected to provide a power output to match the power swivel unit's operating parameters. Such power swivel systems are frequently mounted on a trailer or skid to make the devices more portable. While such power swivel systems provide local monitoring capability and may be controlled by remote pneumatic or electrical based devices, such monitoring and remote operation functions are very limited and not adequate to protect these expensive machines fully. Power swivel systems are expensive to repair and replace and their failure can result in even a greater loss due to rig downtime. Notably, such power swivel systems are often unattended once they are started. What is needed is a better monitoring system that allows for local and remote monitoring and/or control.

One prior art apparatus and method for improved communications with a drill rig is disclosed in commonly owned U.S. Pat. No. 9,845,663 (663) issued on 19 Dec. 2017 to Barry Nield. Another apparatus is disclosed in patent application Ser. No. 16/443,198 (198) filed by Barry Nield et al. on 17 Jun. 2019. The entire contents of such references are hereby incorporated by this reference for all that they disclose for all purposes. The Nield '663 and '198 inventions work well for their intended purpose, but they are not specifically directed to the unique monitoring requirements of a power swivel system and such Nield inventions would be enhanced by adding the disclosed power swivel system monitoring capabilities. The currently disclosed apparatus and method improve upon the Nield '663 and '198 inventions by at least associating sensors with power swivel system components to allow local or remote monitoring and/or control of the operation of the power swivel system.

BRIEF DESCRIPTION OF THE INVENTION

Aspects and advantages of the invention are set forth below in the following description, or may be obvious from the description, or may be learned through practice of the invention.

One embodiment of the present invention comprises a smart box comprising a processing device electrically associated with a memory, and at least one of a local display device or a remote display device and communication technology configured to communicate with a remote device. The smart box is associated with a power swivel system comprising a power swivel unit in fluid communication with a hydraulic pump system driven by a motor controlled by an electronic control module (ECM) which is electrically associated with the processing device. The hydraulic pump may be a variable volume hydraulic pump connected to a controller electrically associated with the processing device. The hydraulic pump system is configured to pump hydraulic fluid through the power swivel unit to activate rotating elements disposed at least partially inside the power swivel unit. The rotating elements are configured to engage and rotate a drill string. A plurality of sensors for generating power swivel system data are electrically associated with the processing device. Such sensors include a rotation sensor configured for generating rotation data for the rotating elements; a torque sensor configured for generating torque data for said rotating elements; and a location sensor configured to generate location data for the power swivel system. The processing device is configured to format the power swivel system data. The formatted or unformatted power swivel date may be stored in a memory and/or at least part of the power swivel system data may be transferred to a remote device for display on a user interface.

Another embodiment of the invention is an apparatus for monitoring a power swivel system and comprises a smart box means associated with a power swivel system. The power swivel system comprises a power swivel unit in hydraulic fluid communication with a hydraulic pump system being driven by a motor associated with an electronic control module (ECM). The smart box means is configured for collecting, formatting, storing and transmitting power swivel system data and warnings to a remote device which can be a remote server, a smartphone, a tablet computer or other similar devices. A plurality of sensors for generating power swivel system data are electrically associated with the processing device and include: a rotation sensor configured for generating rotation data for said rotating elements; a torque sensor configured for generating torque data for said rotating elements; a hydraulic pressure sensor configured to generate hydraulic fluid pressure data for said hydraulic pump system; a temperature sensor configured for generating hydraulic fluid temperature data; and a location sensor configured to generate location data for the power swivel system. One or both of the remote device or the smart box means are configured to evaluate the power swivel system data to determine when to generate power swivel system warnings.

In yet another embodiment of the present invention, a method is disclosed for monitoring the components of a power swivel system comprising a power swivel unit in hydraulic fluid communication with a hydraulic pump system being driven by a motor associated with an electronic control module (ECM). The method includes associating a smart box with a power swivel system wherein the smart box comprises a processing device electrically associated with a memory, a display device and communication technology. A rotation sensor is provided for generating rotation data for the power swivel unit rotating elements. A torque sensor is provided for generating torque data for the rotating elements and a location sensor is provided for generating location data for the power swivel system. The processing device is configured for at least one of collecting, formatting, storing or transmitting the power swivel system data. Threshold data are stored in a memory and are used to determine when a measured power swivel system data value is outside its respective threshold limit. The processing device is further configured use the communication technology to transfer at least part of the power swivel system data and at least part of the threshold data to a remote device so that one of the processing device or the remote device can evaluate the data and cause a local display device or a remote device to generate and display a user interface presenting processed or unprocessed power swivel system data and threshold data. Warning are issued as needed.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeated use of reference characters throughout the present specification and appended drawings is intended to represent the same or analogous features or elements of the present technology.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, the term "in sync" means at the same time and for the same linear distance. For example, two objects move in sync if the two objects move at the same time and if a reference point on each object moves the same linear distance.

Figure 1:
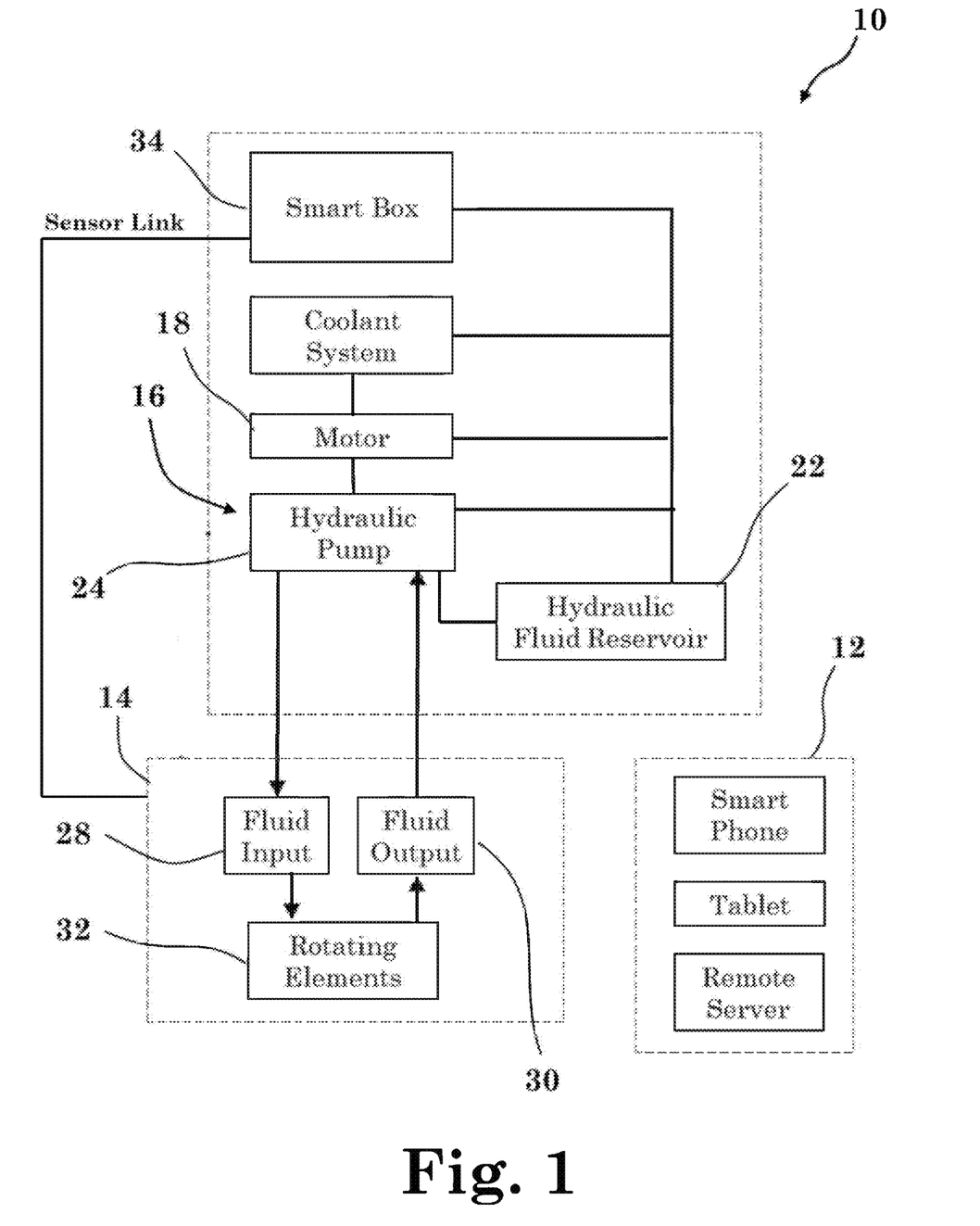
FIG. 1 is a block diagram of an exemplary power swivel system associated with a smart box in communication with a remote device.

Referring to FIG. 1, various embodiments of the present invention provide an apparatus and method for monitoring and recording the status of power swivel system 10 components and communicating the associated data to a remote device 12. The remote device 12 may be any suitable technology including any one or more of a smartphone, tablet computer and a remote server. An exemplary power swivel system 10 generally comprises a power swivel unit 14 in fluid communication with a hydraulic pump system 16 driven by a motor 18 controlled by an electronic control module (ECM) 20. The hydraulic pump system 16 comprises a hydraulic fluid reservoir 22 configured to supply hydraulic fluid to the hydraulic pump system 16. The hydraulic pump system 16 further comprises a hydraulic pump 24 which may be a variable volume hydraulic pump connected to a controller 26 (FIG. 2) to allow the torque and speed of the rotating element (described below) to be varied without the need to adjust motor 18. Examples of such variable volume hydraulic pumps are marketed by National Oilwell Varco. For such a configuration the power swivel unit 14 operation can be adjusted by controlling either the hydraulic pump 24 or the motor 18 (or both).

The hydraulic pump 24 is in fluid communication with a fluid input 28 and a fluid output 30 defined by the power swivel unit 14 which are in fluid communication with rotating elements 30. The hydraulic pump 24 pumps hydraulic fluid through the power swivel unit 14 thereby causing the rotating elements 30 to rotate. The rotating elements 30 are mechanically associated with a drill string which rotates when the rotating elements rotate. As described below, sensors are associated with the rotating elements to monitor speed and torque to reduce the possibility of over speed and over-torque conditions that may damage the power swivel system and/or drill string. Sensors are also associated with the motor 18 and hydraulic pump system 16 to minimize the possibility of damage to such components.

A coolant system is associated with motor 14 and may further provide a cooling function for the hydraulic fluid to help regulate the hydraulic fluid temperature and motor operating temperature.

Figure 2:
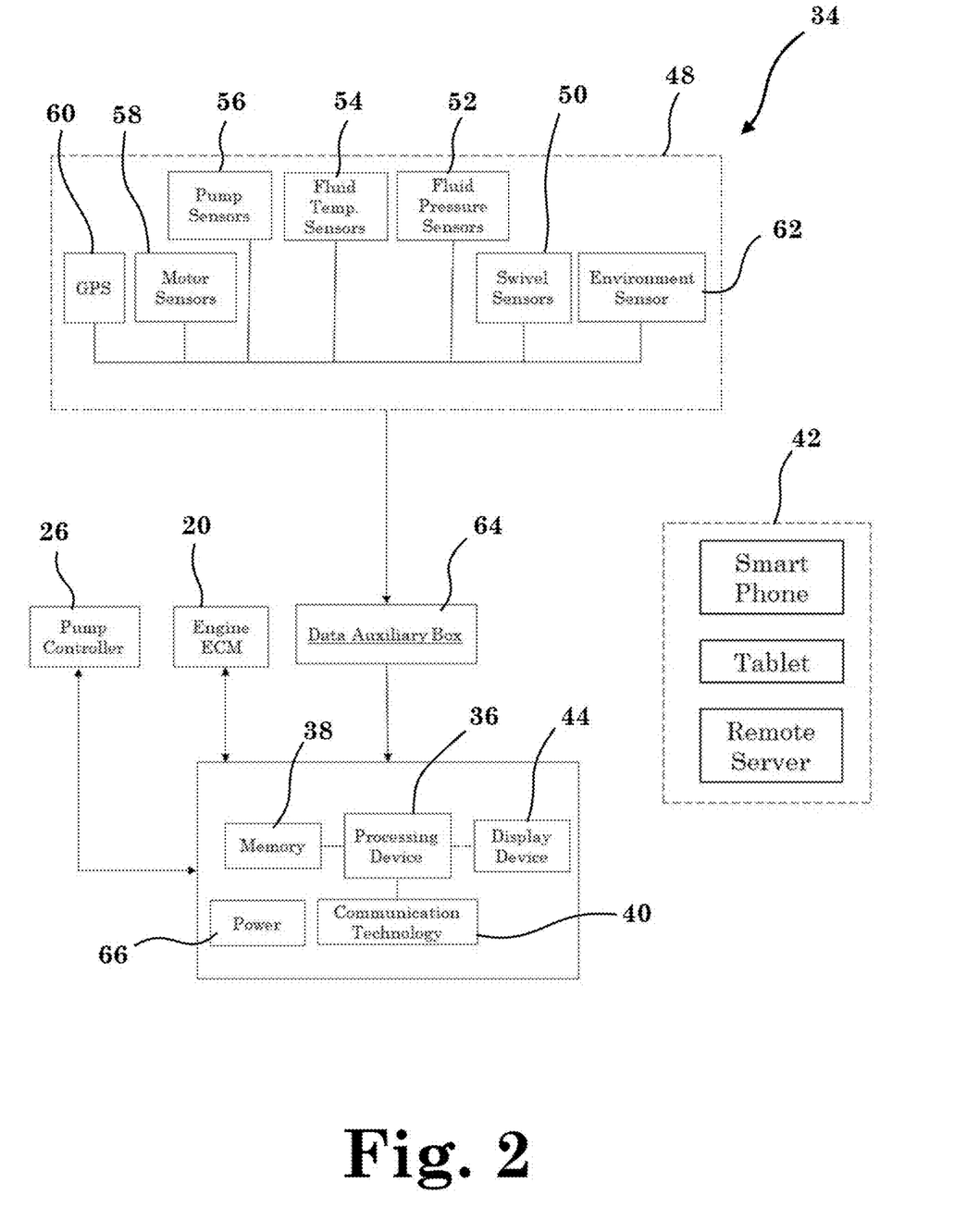
FIG. 2 is a block diagram of a smart box configured for communicating power swivel system status information to a remote device according to one embodiment of the present invention.

Referring to FIG. 2, one exemplary embodiment of an apparatus for monitoring a power swivel system 10 comprises a smart box 34. Smart Box 34 comprises a processing device 36 electrically associated with a memory 38 configured to store program code and data such as power swivel system data. Power swivel system data comprises sensor data and any associated threshold data as described in more detail below. The processing device 36 includes either on-chip communication technology 40 or is electrically associated with communication technology 40 configured to transmit power swivel system data and status information over a direct line, a LAN or a WAN (e.g. Internet) to a remote device 42. Any suitable remote device 42 may be in communication with the smart box 34 including smartphones, tablet computers and remote systems such as remote servers.

The Processing device 36 may be electrically associated with a local display device 44 configured to display a user interface 46 (FIG. 4) such as a graphical user interface (GUI) generated or caused to be generated by processing device 36. Such user interface presents at least processed or unprocessed power swivel data as well as data derived from power swivel data, including warnings. The local display device 44 may be secured to the power swivel system 10 and direct wired to the smart box 34 or be mobile and in wireless communication with said smart box 34.

A plurality of sensors 48 configured for generating power swivel system data is electrically associated with the processing device 36. The plurality of sensors 38 includes swivel sensors 50, fluid pressure sensors 52, fluid temperature sensors 54, hydraulic pump sensors 56, motor sensors 58, location sensors 60 and environment sensors 62.

Swivel sensors 50 include rotation sensors and torque sensors associated with the power swivel unit 14 rotating elements 30. The rotation sensor(s) is configured for generating rotation data for the rotating elements 30 whereas the torque sensor(s) is configured for generating torque data for the rotating elements 30. The rotation sensors and torque sensors may be defined by one sensor module for a plurality of sensors. For one embodiment, the rotation sensors include proximity sensors which may emit electromagnetic fields or radiation such as infrared light. Suitable embodiments of a torque sensor include rotary torque hydraulic sensors such as the one marketed by MB Petroleum Services, LLC.

As noted above, the rotating elements 30 are mechanically associated with a drill string so that when the rotating elements 30 rotate the drill string rotates. The drill string can be damaged if the rotating elements 30 apply too much torque to the drill string. Further, if the rotating elements 30 exceed their designed rotations per minute (RPM) limit the power swivel system can be damaged. The rotation sensors and torque sensors allow such parameters to be monitored and corrective action taken before damage occurs.

The location sensor 60 may be any suitable sensor including the well-known global position system (GPS) technology. The location sensor 60 is configured to determine the location of the power swivel system 10.

Figure 4:
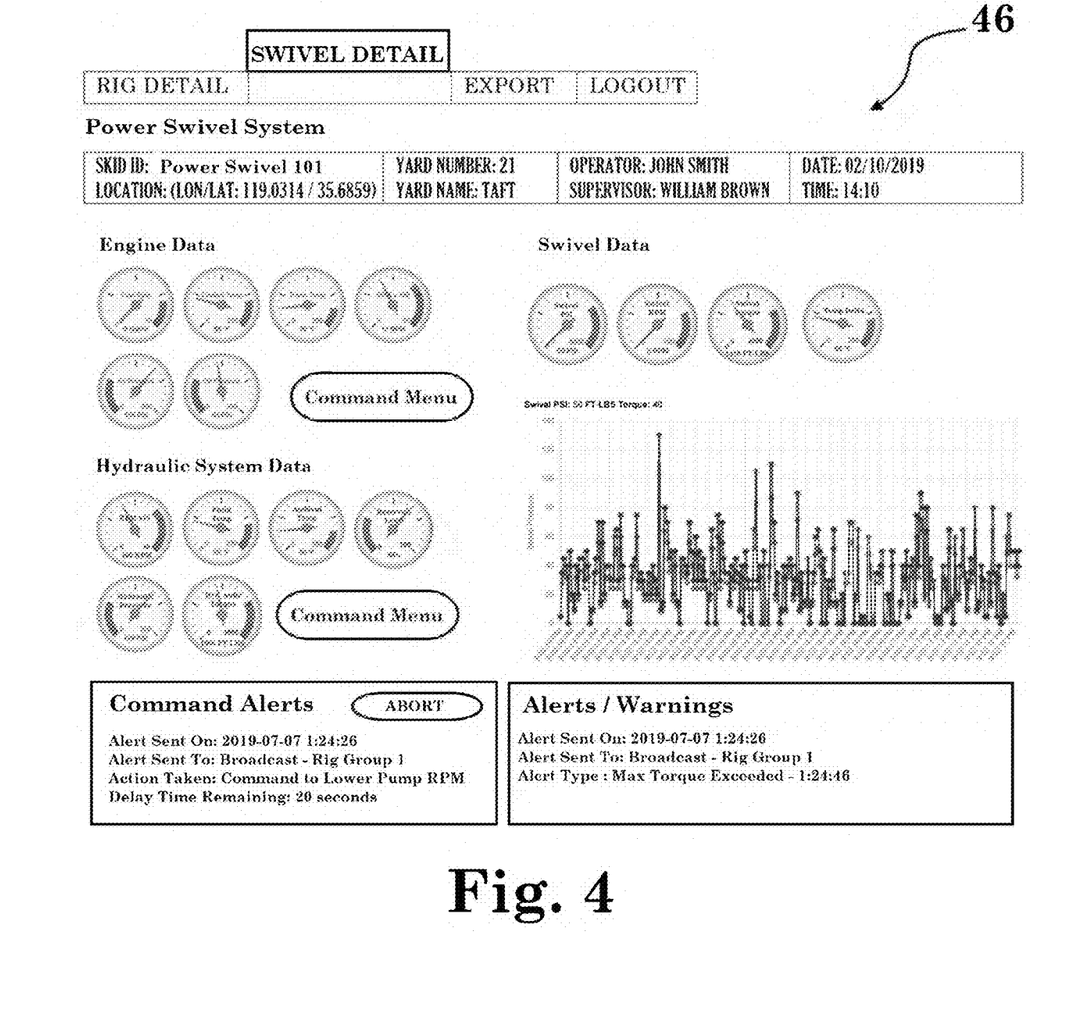
FIG. 4 is an exemplary screen shot of a GUI showing exemplary data made available to an apparatus user.

The processing device 36 is configured to format the power swivel system data and may store power swivel data and/or transfer at least part of the power swivel system data to a remote device 12 for display on a user interface 46 and/or the local display device 44. Communications, including warning, between the smart box 34 and remote devices can take many forms including SMS and e-mail based communications.

The plurality of sensors 48 may further include a hydraulic pressure sensor 54 configured to generate hydraulic fluid pressure data related to the hydraulic pump system 16 as well as a fluid temperature sensor associated with the hydraulic fluid. The fluid temperature sensor is configured to generate hydraulic fluid temperature data. Hydraulic system pressures and temperatures are important parameters to monitor to prevent damage to the hydraulic pump system 16. Examples of suitable environment sensors 82 include weather sensors, sound sensors, image sensors and user-defined sensors.

Attention is now directed to the pump sensors 56 and motor sensors 58. For one exemplary embodiment, the operation parameters of the motor 18 may be monitored and modified using the motor EMC controller 20 and the operating parameters of hydraulic pump 16 may be monitored and modified using the pump controller 16 for embodiments comprising an EMC and pump controller. Also, custom motor sensors 58 and pump sensors 56 may be electrically associated with the processing device 36. As described in more detail below, the motor and pump sensor data are preferably compared to threshold data to determine when to generate motor and/or pump commands to modify their operating status.

It should be appreciated that the plurality of sensors 48 may be considered a "sensor array" which is simply one or more sensors disposed in a common housing or separate housings and the plurality of sensors may be routed to an optional data auxiliary box 64 configured to house the various connections necessary to route the sensor data/signals to the processing device 36. Sensors may alternatively (collectively or individually) communicate with smart box 34 via wireless technology and some sensors may also be housed inside smart box 34.

Threshold Data

One of ordinary skill in the art will appreciate that power swivel units have rated performance characteristics that should not be exceeded. For example, the NOV S-150 power swivel has a maximum torque of 8100 ft. lbs. and speeds of up to 150 RPM with a maximum hydraulic fluid circulating pressure of 5,000 PSI. Threshold values are set to minimize the risk of exceeding rated performance characteristics and damaging the power swivel system 10 components and/or the associated drill string.

The claimed apparatus for monitoring a power swivel system 10 uses threshold values to determine when a measured power swivel system 10 value falls outside a threshold. When it is determined that a measured power swivel system 10 value is outside (exceeds) a threshold value a warning is generated and transmitted to at least one of a local device and a remote device. The smart box 34 may execute a command signal for altering one of the motor 18 operations and/or the hydraulic pump system 16 operations after a predefined delay if no override signal is received. The command signal may be stored in memory 38 or may be transmitted to the smart box 34 from a remote device. The delay period is preferably user selectable and may be zero (i.e. no delay). It should be appreciated that "exceeding a threshold" means to cross a threshold whether it be an upper threshold or a lower threshold. Thus, if a minimum pressure threshold value is 500 psi and the measured pressure is 490 psi the measured pressure has exceeded the threshold for the purposes of this document.

As noted above, swivel sensors 50 comprise a rotation sensor and a torque sensor. At least one rotation data threshold value defining at least one rotation limitation is stored in memory 38. The smart box 34 is configured to compare the measured rotation data with at least one rotation data threshold value and transmits a Speed Alert warning to at least one of a local device or a remote device when the rotation data exceeds a rotation data threshold value. The smart box is configured to execute at least one of said plurality of automatic commands stored in a memory 38 or a command transmitted to the smart box 34 from a remote device after a predefined delay period.

Similarly, at least one torque threshold value defining at least one torque limitation is stored in a memory 38 wherein the smart box 34 compares measured torque data with at least one torque data threshold value and transmits an Over Torque Alert warning to at least one of a local device or a remote device when the torque data exceeds a torque data threshold value. The smart box 34 may further execute at least one of a plurality of automatic commands after a predefined delay period unless an override signal is received during the predefined delay period.

With regard to hydraulic system pressure, at least one pressure threshold value defining at least one pressure limitation is stored in a memory 38. The smart box 34 compares measured hydraulic fluid pressure data to at least one pressure threshold value and generates and transmits a Pressure Alert warning to at least one of a local device and/or a remote device when the hydraulic fluid pressure data exceeds a pressure threshold value. The smart box 34 is furthered configured to execute at least one of a plurality of automatic commands stored in memory 38 or a command received from a remote device after a predefined delay period when a Pressure Alert warning is generated unless an override signal is received during the predefined delay period.

Hydraulic fluid temperature is also monitored as elevated hydraulic temperatures are an indication of a pending system failure. At least one hydraulic fluid temperature threshold value defining at least one temperature limitation is stored in a memory 38. The smart box is configured to generate and transmit a Temperature Alert warning to one of a local device or a remote device when the measured hydraulic temperature data exceeds a pressure threshold value. The smart box 34 is furthered configured to execute at least one of a plurality of automatic commands stored in memory 38 or received from a remote device after a predefined delay period when a Temperature Alert warning is generated unless an override signal is received during the predefined delay period.

As noted above, the power swivel unit 14 housing rotating elements and they ride on bearings. For most power swivel systems, the hydraulic fluid not only activates the rotating elements but provides lubricant for the bearings. As bearings begin to fail, they heat up. To better detect a pending bearing failure, a first temperature sensor is associated with a fluid input 28 defined by the power swivel unit 14 and a second temperature sensor is associated with a fluid output 30 defined by the power swivel unit 14. The processing device 36 is configured to monitor the fluid temperature delta between the fluid input 28 and the fluid output 30 and generate a Swivel Temperature Alert warning when the measured temperature delta exceeds a temperature delta threshold value.

Graphical User Interface

As noted above, a local display device 44 may be wired directly to the processing device 36 and be disposed on the power swivel system 10 or it may be a portable device in wireless communication with the processing device 36. For example, the local display device 44 may be a tablet computer carried by a user in close proximity to the power swivel system 10. Such wireless technology is relatively low power requiring the local display device 44 to be within a predefined distance to the power swivel system. Alternatively, the processing device 36 may be in communication with a remote display device 12 over a local or wide area network such as the Internet.

Referring now to FIG. 4, a Graphical User Interface (GUI) 46 is presented. For the basic GUI 46 configuration, the display device (local or remote) simply displays a selection of power swivel system data comprising at least part of the measured sensor data and preferably at least some of their associated threshold values. The display also displays warnings/alerts. For one alternative embodiment, the GUI 46 generated on a local display device 44 presents the power swivel system data and provides a control interface to allow a user to issue control commands that are transmitted to the smart box 34 to allow a remote user to control the power swivel system 10 components through the GUI 46. For embodiments comprising an ECM 20 (or similar technology) and/or a pump controller 26, such control options include issuing commands for controlling the motor 18 and/or the hydraulic pump system 16.

It should be appreciated that the command signals may be "automatic" commands stored in a memory 38 or received commands transmitted to the smart box 34 from a remote device.

The smart box 34 components are normally powered by the power swivel system 10 when the power swivel system 10 is in operation. For one embodiment, an alternator is associated with the motor 16 that is configured to supply a DC power source (e.g. 12 to 15 VDC) to power the power swivel system 10. That said, the power swivel system 10 will need a power source to start the motor 16 when the power swivel system is not operating. One example of such a power source is one or more heavy duty 12 VDC automobile batteries. Power source 66 (FIG. 2) for smart box 24 may be such automobile batteries or a dedicated battery that is preferably charged by the power swivel system 10 when the motor 18 is operating. Power source 66 allows the smart box 34 to operate when the power swivel system 10 is not operating. Such a configuration is useful, for example, when one wishes to locate a power swivel system 10 that is not operating.

Monitoring and Reporting Process

Figure 3:
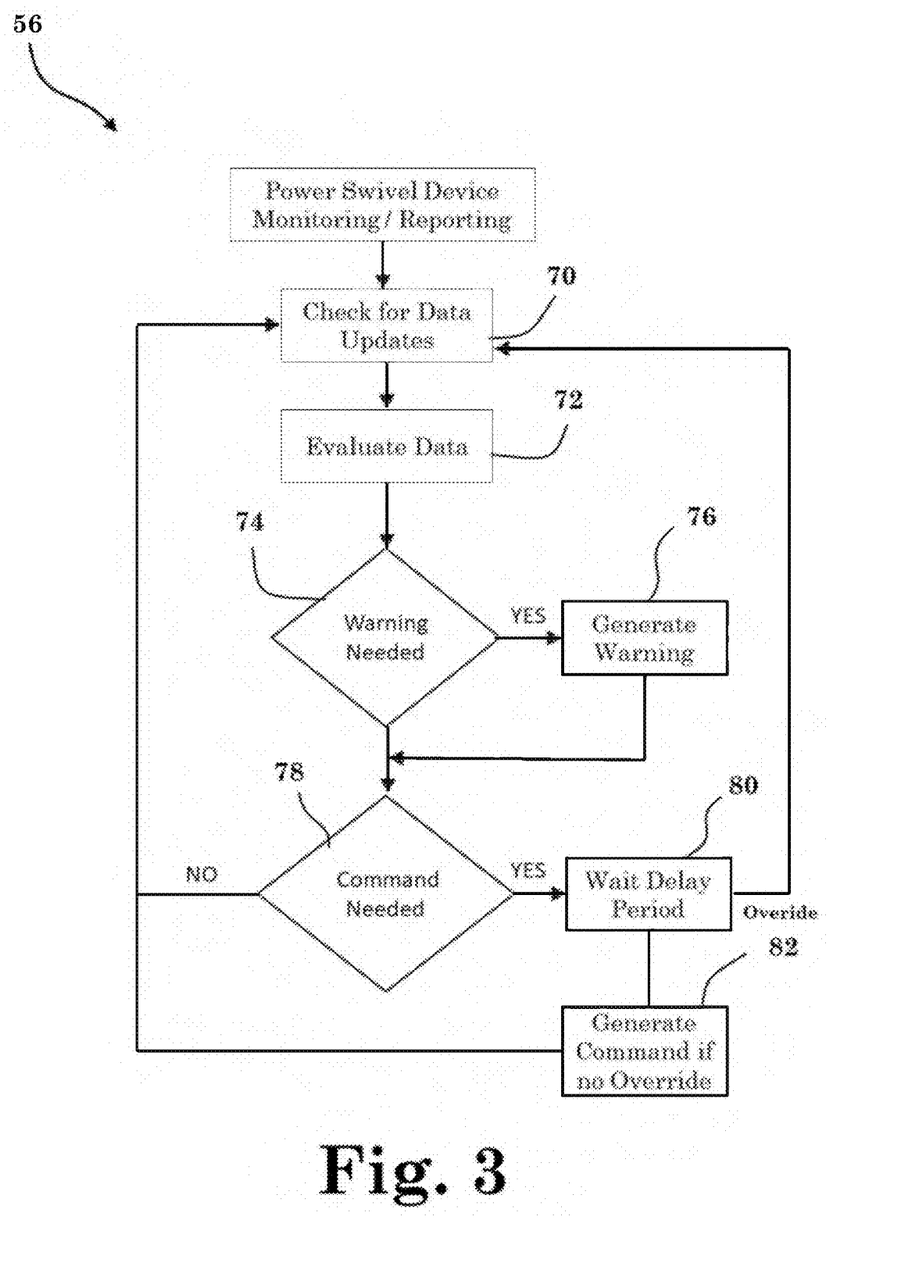
FIG. 3 is an exemplary method for monitoring a power swivel system and generating warnings and/or commands as needed.

Referring now to FIG. 3, an exemplary monitoring and reporting process 56 is presented. At block 70 the smart box 34 checks for sensor data updates and remote device updates (i.e. updates received from remote devices) and updates the GUI 46 display as needed. At block 72, the data is evaluated to determine if any warnings should be generated. At block 72, the smart box 34 compares sensor data to its relevant threshold values and if the detected sensor data is outside a threshold, program control is passed to step 76 and a warning is issued which includes updating the GUI 46 as needed. Such warnings can include transmitting messages using SMS and/or e-mail technologies. If no warning condition is detected or after a warning is issued, program control is passed to block 78 where the smart box 34 determines if a command should be executed. For this step, a generate command condition can be caused by any one of at least three events: (1) a command request is received from a local device 44; (2) a command request is received from a remote device (12, 42); and (3) an automatic command is generated by smart box 34. If a command is to be executed, program control passes to box 80 and the smart box 34 waits a predefined delay period and if no override signal is received, program control passes to box 82 and the smart box 34 executes the command. If no command is required, or an overridden signal is received, or after a command has been executed, program control passes back to block 70 and the process repeats. Notably, before an automatic command is executed a warning is issued indicating that an automatic command is pending, the GUI 46 is preferably updated with such warning along with a countdown timer value to allow a user time to override the pending command. A similar wait process may also be used for any command to be executed regardless of what device initiated the command request.

Smart Box Electronics

The smart box 34 electronic hardware comprises standard components known in the art although such hardware configuration and control routines are novel. The processing device 36 may be a microprocessor that supports standard operating systems and application software as well as ASICs (application specific integrated circuit) or ASSPs (application specific standard product) or a PIC (programmable Intelligent Computer). The processing device 36 may comprise onboard ROM, RAM, EPROM type memories 38 for storing data and/or program code such as firmware. Processing device 36 may be further associated with off-chip memory 38 including remote storage such as cloud storage. For one embodiment, smart box 34 comprises a DSP/ASSP (not shown) electrically associated with the processing device 36 configured to perform signal processing tasks such as voice, audio, video, encoding, decoding as well as other data and signal processing functions. Such allows a video sensor, for example, to record images and sound as well as generate the same.

The communication technology 40 may define a transmitter and/or a transceiver configured to transmit a data signal to a remote device 12, 42 (smartphone, WiDi enabled display, remoter computer, etc.). Embodiments of suitable communication technologies 40 include custom designs as well as WiFi and Bluetooth transceivers, GPRS, GSM, GPRS, 3G, 4G, 5G and EDGE enabled networks as well as WAP networks. Such communications may take the form of SMS and e-mail messages.

One of ordinary skill in the art will recognize that the inherent flexibility of computer-based systems allows for a great variety of possible configurations, combinations, and divisions of tasks and functionality between and among components. For instance, methods discussed herein may be implemented using a single server or multiple servers working in combination. Similarly, databases and logic for manipulating the databases may be implemented on a single system or distributed across multiple systems sequentially or in parallel. Data transferred between components may travel directly or indirectly.

The various computer systems discussed herein are not limited to any particular hardware architecture or configuration. Embodiments of the methods and systems set forth herein may be implemented by one or more general-purpose or customized computing devices adapted in any suitable manner to provide the desired functionality. The device(s) may be adapted to provide additional functionality complementary or unrelated to the present subject matter, as well. For instance, one or more computing devices may be adapted to provide desired functionality by accessing logic or software instructions rendered in a computer-readable form. When software is used, any suitable programming, scripting, or another type of language or combinations of languages may be used to implement the teachings contained herein. However, software need not be used exclusively, or at all. For example, some embodiments of the systems and methods set forth herein may also be implemented by hard-wired logic or other circuitry, including, but not limited to application-specific circuits. Of course, combinations of computer-executed software and hard-wired logic or other circuitry may be suitable, as well.

Embodiments of the systems and methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the computer(s) to implement one or more embodiments of the methods of the present subject matter. Additionally, or alternatively, the computing device(s) may comprise circuitry that renders the device(s) operative to implement one or more of the methods of the present subject matter. Furthermore, components of the presently disclosed technology may be implemented using one or more computer-readable media. Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An apparatus for monitoring a power swivel system, said apparatus comprising:
    a smart box comprising a processing device electrically associated with a memory, and least one of a local display device or a remote display device and communication technology configured to communicate with a remote device wherein said smart box is associated with a power swivel system comprising a power swivel unit in fluid communication with a hydraulic pump system driven by a motor controlled by an electronic control module (ECM) wherein said ECM is electrically associated with said processing device and wherein said hydraulic pump system is configured to pump a hydraulic fluid through said power swivel unit to activate rotating elements;
    a plurality of sensors for generating power swivel system data wherein each sensor is electrically associated with said processing device and wherein said plurality of sensors include:
    a rotation sensor associated with said power swivel unit and configured for generating rotation data for said rotating elements;
    a torque sensor associated with said power swivel system and configured for generating torque data for said rotating elements;
    a location sensor configured to generate location data for said power swivel system; and
    wherein said processing device is configured to format said power swivel system data and at least one of store said power swivel data and transfer at least part of said power swivel system data to said remote device for display on a user interface.

2. The apparatus for monitoring a power swivel system as in claim 1, wherein a plurality of automatic commands for controlling said power swivel system are stored in said memory and wherein said hydraulic pump system comprises one of a non-variable volume hydraulic pump or a variable volume hydraulic pump connected to a controller electrically associated with said processing device.

3. The apparatus for monitoring a power swivel system as in claim 2, wherein at least one rotation data threshold value defining at least one rotation limitation is stored in said memory and wherein said smart box compares said rotation data with said at least one rotation data threshold value and transmits a Speed Alert warning to at least one of a local device or said remote device when said rotation data exceeds a rotation data threshold value and wherein said smart box is configured to execute at least one of said plurality of automatic commands after a predefined delay period unless an override signal is received during said predefined delay period.

4. The apparatus for monitoring a power swivel system as in claim 2, wherein at least one torque threshold value defining at least one torque limitation is stored in said memory and wherein said smart box compares said torque data with said at least one torque data threshold value and transmits an Over Torque Alert warning to at least one of a local device or said remote device when said torque data exceeds a torque data threshold value and wherein said smart box is configured to execute at least one of said plurality of automatic commands after a predefined delay period unless an override signal is received during said predefined delay period.

5. The apparatus for monitoring a power swivel system as in claim 2, wherein said plurality of sensors further comprises a hydraulic pressure sensor configured to generate hydraulic fluid pressure data related to said hydraulic pump system and a temperature sensor associated with said hydraulic fluid configured to generate hydraulic fluid temperature data.

6. The apparatus for monitoring a power swivel system as in claim 5, wherein at least one pressure threshold value defining at least one pressure limitation is stored in said memory and wherein said smart box compares said hydraulic fluid pressure data to said at least one pressure threshold value and generates and transmits a Pressure Alert warning to at least one of a local device and said remote device when said hydraulic fluid pressure data exceeds a pressure threshold value and wherein said smartbox is furthered configured to execute at least one of said plurality of automatic commands after a predefined delay period when said Pressure Alert warning is generated unless an override signal is received during said predefined delay period.

7. The apparatus for monitoring a power swivel system as in claim 5, wherein at least one hydraulic fluid temperature threshold value defining at least one temperature limitation is stored in said memory wherein said smart box is configured to generate and transmit a Temperature Alert warning to one of a local device or said remote device when said hydraulic temperature data exceeds a hydraulic fluid temperature threshold value and wherein said smart box is furthered configured to execute at least one of said plurality of automatic commands after a predefined delay period when said Temperature Alert warning is generated unless an override signal is received during said predefined delay period.

8. The apparatus for monitoring a power swivel system as in claim 1, wherein a first temperature sensor is associated with a fluid input defined by said power swivel unit and a second temperature sensor is associated with a fluid output defined by said power swivel unit and wherein said processing device is configured to monitor the fluid temperature delta between said fluid input and said fluid output and generate a Swivel Temperature Alert warning when said temperature delta exceeds a temperature delta threshold value.

9. The apparatus for monitoring a power swivel system as in claim 8, further comprising an ambient temperature sensor electrically associated with said processing device wherein said processing device is configured to store ambient temperature data comprising a maximum ambient temperature, a minimum ambient temperature and a normal ambient temperature for the location of said power swivel system and use said stored ambient temperate data and real time temperature data to determine when to generate said Swivel Temperature Alert warning.

10. The apparatus for monitoring a power swivel system as in claim 1, wherein said remote device defines at least one of a smart phone, a tablet computer or a remote server.

11. An apparatus for monitoring a power swivel system, said apparatus comprising:
a smart box means associated with a power swivel system comprising a power swivel unit in hydraulic fluid communication with a hydraulic pump system being driven by a motor associated with an electronic control module (ECM), said smart box means configured for collecting, formatting, storing and transmitting power swivel system data and warnings to a remote device;
a plurality of sensors for generating power swivel system data wherein each sensor is electrically associated with said processing device and wherein said plurality of sensors include:
a. a rotation sensor associated with rotating elements defined by said power swivel unit wherein said rotation sensor is configured for generating rotation data for said rotating elements;
b. a torque sensor associated with said power swivel system wherein said torque sensor is configured for generating torque data for said rotating elements;
c. a hydraulic pressure sensor associated with said hydraulic pump system wherein said hydraulic pressure sensor is configured to generate hydraulic fluid pressure data for said hydraulic pump system;
d. a temperature sensor associated with said hydraulic fluid wherein said temperature sensor is configured for generating hydraulic fluid temperature data; and
e. a location sensor associated with said power swivel system wherein said location sensor is configured to generate location data for said power swivel system; and
wherein one of said remote device or said smart box means is configured to evaluate said power swivel system data to determine when to generate power swivel system warnings.

12. The apparatus for monitoring a power swivel system as in claim 11, wherein said smart box means is configured to cause a user interface to be displayed on a local display device or a remote display device and wherein said user interface comprises at least part of said power swivel system data.

13. The apparatus for monitoring a power swivel system as in claim 12, wherein a plurality of automatic commands are stored in said memory and wherein said hydraulic pump system comprises one of a variable volume hydraulic pump connected to a controller electrically associated with said processing device or a non-variable volume hydraulic pump.

14. The apparatus for monitoring a power swivel system as in claim 13, wherein at least one rotation data threshold value defining at least one rotation limitation is stored in said memory and wherein said smart box means compares said rotation data with said at least one rotation data threshold value and transmits a Speed Alert warning when said rotation data exceeds a rotation data threshold value and wherein said smart box means is configured to execute at least one of said plurality of automatic commands after a predefined delay period when a Speed Alert warning is generated unless an override signal is received during said predefined delay period.

15. The apparatus for monitoring a power swivel system as in claim 13, wherein at least one pressure threshold value defining at least one pressure limitation is stored in said memory and wherein said smart box means compares said hydraulic fluid pressure data to said at least one pressure threshold value and generates and transmits a Pressure Alert warning to at least one of a local device and said remote device when said hydraulic fluid pressure data exceeds a pressure threshold value and wherein said smart box means is furthered configured to execute at least one of said plurality of automatic commands after a predefined delay period when said Pressure Alert warning is generated unless an override signal is received during said predefined delay period.

16. The apparatus for monitoring a power swivel system as in claim 13, wherein at least one hydraulic fluid temperature threshold value defining at least one temperature limitation is stored in said memory wherein said smart box means is configured to generate and transmit a Temperature Alert warning to one of a local device or said remote device when said hydraulic temperature data exceeds a hydraulic fluid temperature threshold value and wherein said smart box is furthered configured to execute at least one of said plurality of automatic commands after a predefined delay period when said Temperature Alert warning is generated unless an override signal is received during said predefined delay period.

17. A method for monitoring the components of a power swivel system comprising a power swivel unit in hydraulic fluid communication with a hydraulic pump system being driven by a motor associated with an electronic control module (ECM), said method comprising:
- associating a smart box with a power swivel system wherein said smart box comprises a processing device electrically associated with a memory, a display device and communication technology;
- associating a rotation sensor with said processing device and rotating elements defined by said power swivel unit wherein said rotation sensor is configured for generating rotation data for said rotating elements;
- associating a hydraulic pressure sensor with said processing device and said hydraulic pump system wherein said hydraulic pressure sensor is configured to generate hydraulic fluid pressure data for said hydraulic pump system;
- associating a location sensor with said processing device and said power swivel system wherein said location sensor is configured to generate location data for said power swivel system;
- configuring said processing device for at least one of collecting, formatting, storing or transmitting power swivel system data comprising said rotation data, said hydraulic fluid pressure data and said location data;
- storing threshold data in said memory;
- configuring said processing device to use said communication technology to transfer at least part of said power swivel system data and at least part of said threshold data to a remote device;
- configuring one of said processing device or said remote device to cause said display device or a remote device to generate and display a user interface wherein said user interface presents processed or unprocessed power swivel system data and threshold data; and
- configuring one of said processing device or said remote device to evaluate said power swivel system data using said threshold data to determine when a warning should be generated.

18. The method for monitoring the components of a power swivel system as in claim 17, further comprising the step of configuring one of said processing device or said remote device to generate an automatic command pending warning, define a predefined wait time and wait said predefined wait time and then executing said automatic command if no override signal has been received.

19. The method for monitoring the components of a power swivel system as in claim 18, associating a temperature sensor with said smartbox and said hydraulic fluid wherein said temperature sensor is configured for generating hydraulic fluid temperature data and wherein said power swivel system data includes said hydraulic fluid temperature data.

20. The method for monitoring the components of a power swivel system as in claim 19, wherein said hydraulic pump system comprises a variable volume hydraulic pump connected to a controller and wherein said controller is associated with said processing device.

* * * * *